Figure 8:
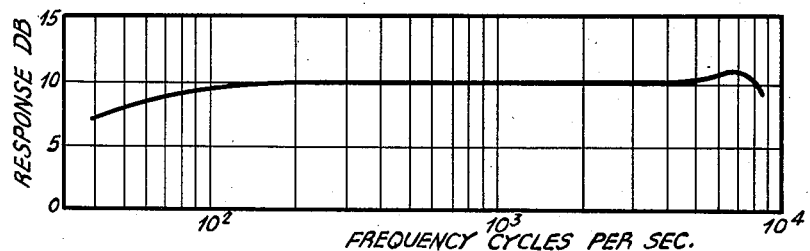

Jan. 25, 1938.                H. F. OLSON                  2,106,224
DEVICE FOR TRANSFORMING ACOUSTICAL ENERGY INTO ELECTRICAL ENERGY
                    Filed Nov. 21, 1933        2 Sheets-Sheet 1
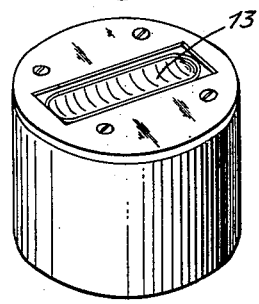
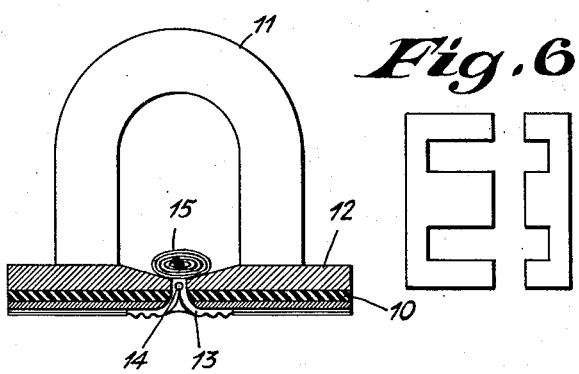
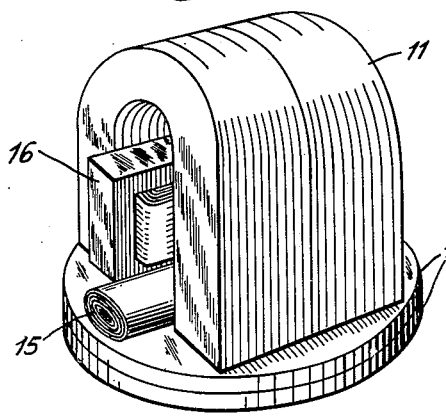
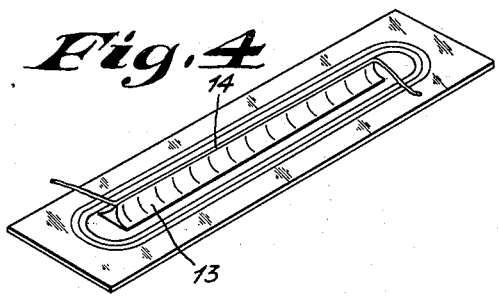
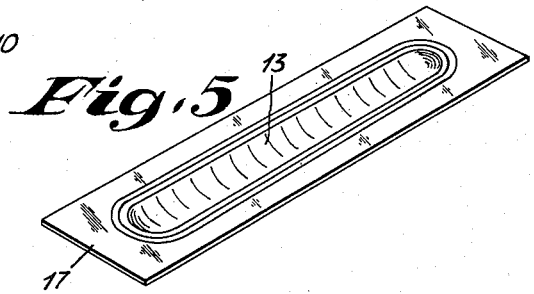
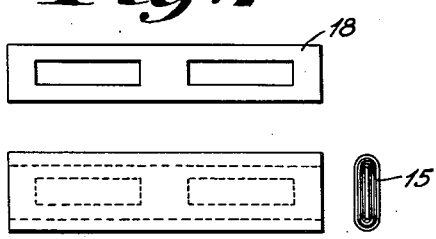
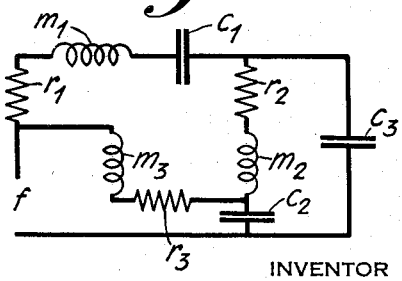
INVENTOR
HARRY F. OLSON
BY
ATTORNEY Jan. 25, 1938.  H. F. OLSON  2,106,224
DEVICE FOR TRANSFORMING ACOUSTICAL ENERGY INTO ELECTRICAL ENERGY
Filed Nov. 21, 1933  2 Sheets-Sheet 2

INVENTOR
HARRY F. OLSON
BY
ATTORNEY

Patented Jan. 25, 1938

2,106,224

UNITED STATES PATENT OFFICE 2,106,224

DEVICE FOR TRANSFORMING ACOUSTICAL ENERGY INTO ELECTRICAL ENERGY

Harry F. Olson, Collingswood, N. J., assignor to Radio Corporation of America, a corporation of Delaware Application November 21, 1933, Serial No. 699,089

5 Claims. (Cl. 179—138)

This invention relates to devices for transforming acoustical energy into electrical energy and more particularly to an improved microphone of the electrodynamic type.

The transformation of acoustical into electrical energy may be accomplished in a multitude of ways. In any system, in general, the ratio of the electrical energy output to the sound energy density should be independent of the frequency. This restriction limits the types of electrical and associated mechanical systems which may be used to attain the response objective. The particular type of electrical system depends upon the mechanical system and vice versa. In the following table are listed the various types of microphones and the general electrical and mechanical characteristics.

| Response corresponds to— | Type | Control of vibrating system | Impedance of mechanical system | Force available for driving system | Velocity of system | Amplitude of system | Developed E. M. F. |
|---|---|---|---|---|---|---|---|
| Pressure | Condenser | Stiffness | $Z=\alpha_\omega^{\frac{1}{2}}$ | Constant | $\alpha\omega$ | Constant | Constant. |
|  | Carbon | do | $Z=\alpha_\omega^{\frac{1}{2}}$ | do | $\alpha\omega$ | do | Do. |
|  | Ribbon | Resistance | Z=constant | do | Constant | $\alpha_\omega^{\frac{1}{2}}$ | Do. |
|  | Dynamic | do | Z=constant | do | do | $\alpha_\omega^{\frac{1}{2}}$ | Do. |
|  | Inductor | do | Z=constant | do | do | $\alpha_\omega^{\frac{1}{2}}$ | Do. |
| Velocity (pressure gradient). | Ribbon | Mass | $Z\alpha\omega$ | $\alpha\omega$ | Constant | $\alpha_\omega^{\frac{1}{2}}$ | Constant. |

In the case of the electrodynamic systems the ratio of the velocity of the conductor to the pressure or applied force must be independent of the frequency in order that the ratio of the electromotive force to the pressure shall be independent of the frequency. For the condenser and carbon systems, the ratio of the amplitude of the vibrating system to the pressure or applied force must be independent of the frequency in order that the ratio of the electromotive force to the pressure or applied force shall be independent of the frequency.

Each type of microphone listed above possesses certain acoustical mechanical and electrical advantages and disadvantages, and the best choice for a particular job depends upon a correlation of the operating conditions with the microphone characteristics. For example, the directional characteristics and extremely high fidelity of the "velocity" ribbon microphone are found to be very useful for studio pickup, sound reenforcing systems and other uses requiring a high-quality microphone with directional characteristics for discrimination against undesirable sounds. However, for certain types of sound collection a directional type of microphone is not necessary. For this work a microphone having a resistive or stiffness-controlled mechanical system possesses advantages over the mass-controlled type.

The characteristics of resistance and stiffness-controlled microphones will now be discussed briefly. The noise, limited frequency and load limitations of the carbon microphone precludes its use for high quality pickup at the present time. The high impedance, instability, and unreliability are certain disadvantages of the condenser microphone. The resistance controlled electrodynamic microphone seems to be the best solution for a non-directional microphone adapted to the conditions of outside pickup work. A dynamic microphone now used to some extent falls in this class. However, due to its construction, this particular microphone appears to be a difficult manufacturing proposition. Accordingly, the present invention has for its purpose the development of an electrodynamic microphone which does not possess the complexities of construction associated with the moving coil type, but at the same time, retains the desirable acoustic features of this instrument.

An inductor microphone system constructed in accordance with the invention may consist of a diaphragm coupled to a conductor located in a magnetic field, a suitable transformer for raising the impedance to that suitable for transmission over ordinary lines, and an acoustic network for obtaining relatively uniform response over the range from 50 to 7000 cycles. The essential components of this system are the diaphragm and conductor, the magnetic circuit, the transformer and the acoustic resistance.

The invention will be better understood from the following description when considered in connection with the accompanying drawings and its scope will be pointed out in the appended claims.

Referring to the drawings,

Fig. 1 is a plan view of the microphone,

Fig. 2 illustrates the microphone with its casing removed to show the arrangement of its various parts, Fig. 3 is a sectional view illustrating the various features of the microphone, Figs. 4 and 5 illustrate a preferred form of diaphragm and moving conductor combination, Fig. 6 illustrates certain features of the transformer combinations which constitute a part of the device, and Fig. 7 illustrates a preferred form of acoustic resistance element, and Figs. 8 to 12 are explanatory diagrams.

As illustrated more clearly in Fig. 2, the device includes a base 10 upon which is mounted a magnetic structure 11 provided with pole pieces 12 (Fig. 3) arranged to form an air gap, the entire assembly constituting a hollow structure. Mounted upon a V-shaped diaphragm 13 suitably supported by the base 10 is a conductor 14 arranged to be moved in the magnetic field of the air gap in response to vibration of the diaphragm 13. In order that movement of the mechanical system including the conductor may be resistance controlled a silk roll 15 is arranged to extend across the air gap. The opposite ends of the conductor 14 are connected to the input circuit of a transformer 16 preferably mounted within the magnetic structure 11 as indicated by Fig. 2.

It will be noted that the V-shaped diaphragm 13 is mounted within a support 17 (see Figs. 4 and 5); that the conductor 14 is arranged linearly along the apex of the conductor; and that the silk roll 15 is wound around a support 18 as indicated in Fig. 7.

In the case of the diaphragm and conductor assembly shown in Figs. 4 and 5, the face of the diaphragm is a sheet of 0.00025 inch aluminum made with two corrugations along the outside edge, dished in the central portion and supported along the outside edge of the outer corrugation in a rigid frame. A V-shaped paper connecting link carrying the 10 mil aluminum conductor is fastened to the underside of the aluminum diaphragm with vulcaloc cement. The connecting leads of the conductor are flattened to 2 mil thickness to reduce the stiffness. These leads are brought to binding posts connected to the primary of the transformer. The ends of the prism formed by the paper V and the diaphragm are closed. The entrapped air forms a chamber of extremely high stiffness and is one of the features of this system. The effective mass of the aluminum diaphragm is .0055 gm. The mass of the 1 mil waxed paper V is .0165 gm. The effective mass of the conductor is .0068 gm. The total mass of the vibrating system is .0288 gm. The compliance of the two corrugations which support the diaphragm is $5.7 \times 10^{-6}$ cm./dyne. The resonance of this value of mass and compliance occurs at 400 cycles. This value of stiffness is sufficient to prevent undue excitation due to shock, vibration, wind, etc., and still retain a system in which uniform response can be obtained at low frequencies.

The use of a small, straight conductor makes it possible to design a very efficient magnetic circuit. The area of the air gap is 0.8 sq. cm. The cross sectional area of the permanent magnet is 6.4 sq. cm. The leakage flux in the system is 1.2 times the active air gap flux. The effective length of the magnet is 7.0 cm. From the magnetization curves of cobalt steel by successive approximations the magnetomotive force taking cognizance of the leakage and air gap flux is 165 gilberts per cm., which gives a flux density of 15,000 gausses in the air gap. The measured flux varies from 14,000 to 15,000 gausses. The low leakage in this system and high flux density shows that this is a very efficient system. The flux density at which the magnets work yields the minimum amount of magnetic material as will be seen from the curves of this material. The clearance between the conductor and paper V and the pole pieces is 9.0 mils which yields a system which should be very easily centered and remain centered.

The resistance of the conductor and leads is 0.05 ohm. For transmission over a line, this impedance must be raised by means of a transformer. In order to conserve space it is desirable to nest the transformer in the magnetic circuit as shown in Fig. 2. This required the design of a new size of lamination. The particuar size of lamination is shown in Fig. 6. The number of turns on the primary and secondary for raising the impedance of the conductor to 250 ohms is 10 turns No. 18 B & S wire for the primary and 700 turns of No. 33 B & S wire for the secondary. The characteristic of this transformer is shown in Fig. 8 and indicates that the response is good from 50 to 8000 cycles. The steady flux which flows through the transformer due to the proximity to the magnetic system does not seem to impair the performance of the transformer. (It does reduce the inductance about 20%.) The increased leakage incurred in the magnetic circuit decreases the flux in the air gap less than 5%.

As pointed out above, the mechanical system of this microphone must be resistive controlled in order that the ratio of the pressure to the induced voltage shall be independent of the frequency. One form of acoustic resistance consists of very fine slits. This form of resistance presents some difficulties in manufacture in that very small tolerances are allowable. For example, in a 2 mil slit the tolerances would need be 0.2 mil because the resistance varies as the inverse cube of the thickness of the slit. The use of a semi-infinite pipe is one of the most ideal forms of resistance. However, in view of the fact that the phase relations between the pressure in the sound wave and velocity of the conductor is of no consequence, it is not necessary to resort to this type of resistance as in the case of the unidirectional microphone. Furthermore, the bulk is the deterring factor in adapting this type of resistance.

Considerable work was done in finding a resistance element which would be easy to manufacture and at the same time retain a system having a large ratio of resistance to reactance. The resistance element is shown in Fig. 7, and consists of several turns of silk cloth wound around a copper frame. The magnitude of the resistance is determined by the number of layers of silk. The resistance is due to the viscosity of the air in the small apertures of the silk. The resistance is inversely proportional to the cube of the diameter of the holes in the silk. The resistance is approximately proportional to the number of layers of silk and inversely proportional to the area exposed. The value of the resistance in one model was 120 acoustical ohms with 12 turns of silk.

Figure 9:
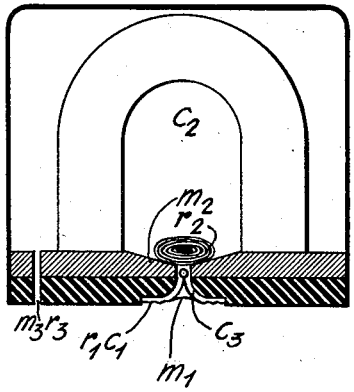

The performance of the vibrating system can be predicted by a consideration of the equivalent circuit of the mechanical system shown in Figs. 9 and 10.

The important constants which determine the performance of this system are as follows:

The mass of the diaphragm and conductor, $m_1$
The compliance of the suspension, $C_1$
The resistance of the suspension, $r_1$
The compliance of the cavity behind the diaphragm, $C_3$
The resistance of the bolt of silk, $r_2$
The effective mass of the bolt of silk, $m_2$
The compliance of the volume of the case, $C_2$
The effective mass of the hole connecting the case volume to the atmosphere, $m_3$
The resistance of the same hole, $r_3$.

In the absence of the resistance, resonance of the mass of the diaphragm, $m_1$, and suspension compliance, $C_1$, occurs at 400 cycles. The value of the resistance, $r_2$, is chosen so that this element predominates in determining the velocity of the conductor. Use is made of the compliance of the cavity back of the diaphragm to reduce the effective mass of the diaphragm and thus extend the response range at the higher frequencies.

Figure 11:
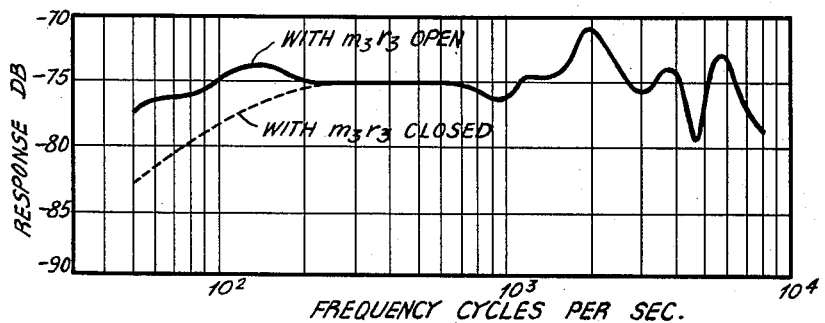

The response for a certain set of constants is shown in Fig. 11. It will be seen that the response is relatively smooth between 100 and 7000 cycles. The rise at the higher frequencies is due to pressure doubling. The resonance peaks occurring at the higher frequencies are due to the resonance of the diaphragm and the cavity and other complex resonances of the system. It will be seen that the response is attenuated below 150 cycles. This is due to the stiffness of the compliance of the suspension system. If we reduce the stiffness of the diaphragm suspension to increase the response at the low frequencies the microphone will be more susceptible to wind, mechanical shocks, etc. However, by placing a tube connecting the atmosphere and the compliance, $C_3$, we can increase the response at the low frequencies, as shown by the curve in Fig. 7. This curve shows that the response is maintained down to 60 cycles by means of this expedient. In cases where it is desirable to attenuate the low frequency response, this can be accomplished by simply closing the hole in the case.

Figure 12:
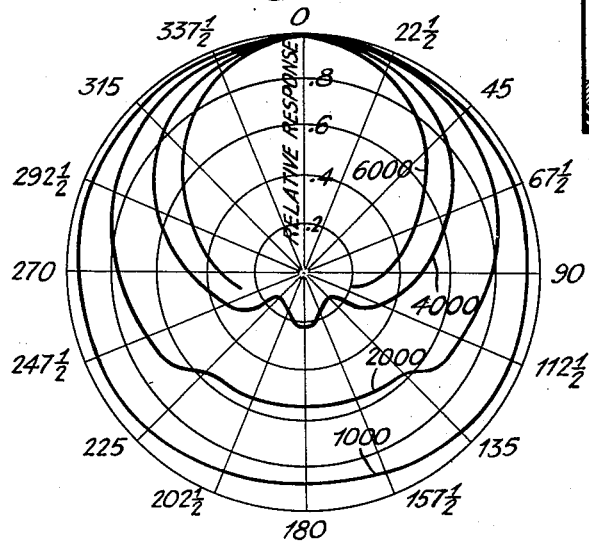

The directional characteristics of this microphone around the conductor as the axis is shown in Fig. 12. These curves show that the microphone is non-directional up to 1000 cycles. Above this frequency, the discrimination against sounds from the back and sides increases with the frequency. The directional characteristics of any pressure microphone depends in general upon the volume and subtended area of the unit as presented to the sound field. The characteristics which this microphone exhibits are to be expected for a unit of this size. The directional characteristics are somewhat sharper in the plane containing the conductor. Therefore, in use, the conductor should be in a vertical direction.

I claim:

1. The combination of a hollow structure arranged to produce a magnetic field, a diaphragm having a closed triangular prismatic projection arranged with its apex in said field, and a linear conductor mounted on said apex.

2. The combination of a structure arranged to produce a magnetic field, a diaphragm, a V-shaped paper connecting link secured to such diaphragm and extending into said field, a linear conductor mounted on said link within said field, a transformer mounted within said structure and connected to said conductor, and acoustical resistance means also mounted within said structure and operably associated with said diaphragm and said conductor.

3. The combination of a structure arranged to produce a magnetic field, a diaphragm, a V-shaped paper connecting link secured to such diaphragm and extending into said field, a linear conductor mounted on said link within said field, and acoustical resistance means mounted within said structure and operably associated with said diaphragm and said conductor.

4. The combination of a structure arranged to produce a magnetic field, a diaphragm having a portion extending into said field, a linear conductor mounted on said diaphragm portion within said field, and a body of cloth mounted within said structure and arranged to resist motion of said diaphragm and conductor.

5. The combination of a structure arranged to produce a magnetic field, a diaphragm having a closed triangular prismatic projection arranged with its apex in said field, a linear conductor mounted on said apex, and acoustical resistance means mounted within said structure and operably associated with said diaphragm and said linear conductor.

HARRY F. OLSON.